United States Patent [19]

Rowland et al.

[11] 4,444,679

[45] Apr. 24, 1984

[54] BLOWING AGENT COMPOSITIONS

[75] Inventors: Donald G. Rowland, Woodbridge; Rhomie L. Heck, III, Naugatuck, both of Conn.

[73] Assignee: Uniroyal, Inc., New York, N.Y.

[21] Appl. No.: 399,518

[22] Filed: Jul. 19, 1982

[51] Int. Cl.$^3$ .................................................. C09K 3/00
[52] U.S. Cl. .............................. 252/350; 264/DIG. 5; 521/89; 521/92; 521/93; 521/95; 521/909
[58] Field of Search ................... 252/350; 521/89, 92, 521/93, 95, 909

[56] References Cited

U.S. PATENT DOCUMENTS

| | | | |
|---|---|---|---|
| 3,658,730 | 4/1972 | Takabashi et al. | 521/92 |
| 3,803,060 | 4/1974 | Roos et al. | 521/89 |
| 3,876,622 | 4/1975 | Motokawa et al. | 521/93 |
| 3,903,015 | 9/1975 | Roos et al. | 252/350 |
| 4,312,776 | 1/1982 | Puri et al. | 521/95 |

*Primary Examiner*—Morton Foelak
*Attorney, Agent, or Firm*—Andrew D. Maslow

[57] ABSTRACT

A blowing agent composition is provided comprising an azodicarbonamid; zinc oxide, zinc carbonate or a zinc salt of $C_1$–$C_4$ organic acid; and an aromatic sulfinic acid or a metal salt of an aromatic sulfinic acid. For each hundred parts by weight of the azodicarbonamid, the zinc oxide, zinc carbonate or zinc salt is 0.25–25 parts by weight and the aromatic sulfinic acid or metal salt is from 1–2000 parts by weight for each 100 parts of the zinc oxide, zinc carbonate or zinc salt. The total weight of the zinc oxide, zinc carbonate or zinc salt plus the aromatic sulfinic acid or metal salt is from 20–25 parts by weight.

9 Claims, No Drawings

BLOWING AGENT COMPOSITIONS

The present invention relates to improved blowing agent compositions, and their preparation and use.

When making an expanded material such as a foamed, synthetic polymeric material, the polymeric material has conventionally been mixed with a blowing agent, such as azodicarbonamide. The performance requirements of blowing agents have now become more and more critical and changes in the composition of the blowing agents can have significant effects on the end product.

Various azodicarbonamide blowing agents are known in the prior art for blowing gas-expandable polymeric material. U.S. Pat. No. 3,903,015 discloses a combination of azodicarbonamide and a sulfinic acid or salt. U.S. Pat. No. 4,312,776 discloses a blowing agent composition comprising a combination of azodicarbonamide, a chromium sulfate and a zinc compound. Similarly, British Pat. No. 1,581,252 discloses an olefin polymer, a cross-linking agent having a decomposition temperature below that of azodicarbonamide and a chromium compound. U.S. Pat. No. 4,263,165 discloses a blowing agent composition comprising azodicarbonamide, zinc oxide and benzenethiol sulphonic acids.

Disadvantages with the known azodicarbonamide blowing agents include the production of non-uniform cells, yellow color appearing in the expanded material, a density of the expanded material being higher than might be desired and insufficient release of a gas at low reaction temperatures.

As will be shown below, the instant invention overcomes many problems faced in the prior art blowing agents. The blowing agent of the invention results in improved control of reduction of decomposition temperature, rate of decomposition and the amount of gas released in the blowing process. The present invention also results in the production of an expanded polymeric material having an improved cell structure, improved uniformity of cells and reduction of discoloration.

It should be noted that the present invention is useful in both non-cured and cured systems and is especially useful when curing or cross-linking of a polymer is desired because it is critical to control the rate of expansion with rate of degree of cure. For example, some preliminary cure is beneficial before decomposition of the blowing agent occurs. The rubber or plastic desirably has some firmness to prevent gas from escaping yet should not be too highly cured otherwise cells cannot form properly. Eventually, when full expansion is achieved, the rubber or plastic should be fully cured.

An important aspect of the invention is that it may provide expansion at 125° C. or lower, but preferably below 145° C., and generally can be used below 160° C.

In accordance with the invention, a blowing agent composition is provided comprising: (a) 100 parts azodicarbonamide; (b) 0.25-25 parts zinc oxide, zinc carbonate or a zinc salt of $C_1$–$C_4$ organic acid; and (c) for every 100 parts of (b) from 1-2000 parts aromatic sulfinic acid or metal salt of aromatic sulfinic acid, wherein the ratio of (a) to (b+c) is in the range of 100/2 to 100/25, all by weight.

In accordance with the invention for expansion of rubber, one may use about 16–30 parts of blowing agent composition to achieve about 0.1 g/cm$^3$ or less, 12–15 parts for about 0.15 g/cm$^3$ and about 4–10 parts for about 0.5 g/cm$^3$ density all per 100 parts of rubber.

It should be understood, however that these requirements may vary depending on the original density of the rubber compound used.

For the expansion of plastics such as polyethylene, usually 0.5 to 30 parts of the blowing agent composition may be employed leading to density reductions of 50 to over 96%.

Preferred thermoplastic polymeric materials include natural and synthetic resins (for example acrylonitrile-butadiene rubbers and blends of acrylonitrile-butadiene rubbers with polyvinyl chloride), polyvinyl chloride, polyvinylidene chloride, polyvinylacetate, polyethylvinyl acetate, polyesters (for example polyethylene terephthalate, and polybutylene terephthalate), polyolefins (for example low and high density polyethylene, and polypropylene), modified polyphenylene oxides, polystyrenes, natural and synthetic rubbers (for example ethylene-propylene rubber, nitrile rubbers, polyisoprene rubber), copolymers of the monomers amongst themselves or with other monomers, (for example a copolymer of ethylvinyl acetate and olefin (such as ethylene or propylene) and mixtures thereof.

Particularly preferred thermoplastics polymeric materials include polyolefins (for example, low and high density polyethylene and polypropylene) and olefin copolymers (for example, copolymers of ethylene and ethylvinyl acetate), preferably those which may be cross-linked before expansion, for example, by means of chemical cross-linking agents or by ionising radiation.

Suitable aromatic sulfinic acids or salts include: benzene sulfinic acid; sodium benzene sulfinate; magnesium-di(benzene sulfinate); ammonium benzene sulfinate; trimethylammonium benzene sulfinate; tertiary butyl ammonium benzene sulfinate; cyclohexyl ammonium benzene sulfinate; benzyl ammonium benzene sulfinate; p-toluene sulfinic acid; barium bis-(p-toluene sulfinate); zinc bis-(p-toluene sulfinate); di-sec.-butylammonium p-toluene sulfinate; morpholinium-p-toluene sulfinate; piperazinium-p-toluenesulfinate; magnesium bis-(p-chlorobenzene sulfinate); zinc bis-(p-chlorobenzene sulfinate); 2,4-dimethylbenzene sulfinic acid; potassium 2,4-dimethylbenzene sulfinate; barium bis-(2,4-dimethylbenzene sulfinate); lead-bis.-(2,4-dimethylbenzene sulfinate); sodium 2,5-dimethylbenzene sulfinate; zinc bis-(2,5-dimethylbenzene sulfinate); 2-chloro-4-methylbenzene sulfinic acid; sodium p-bromobenzene sulfinate; and p-tertiary butyl-benzene sulfinic acid.

Suitable zinc compounds are zinc oxide, zinc carbonate, zinc diformate, zinc diacetate, zinc dipropionate and zinc dibutyrate.

The composition may also include a peroxide promoter. As peroxide promoters, chromium sulfates, especially basic chromium sulfates are employed having the approximate general formula $Cr_2(SO_4)_3.6H_2O$ or $Cr_2(SO_4)_3.15H_2O$, or potassium chromium sulfate of the approximate formula $KCr(SO_4)_2.12H_2O$. Also suitable are sodium chromates ($Na_2CrO_4$; $Na_2CrO_4.10H_2O$) and chromium phosphates ($CrPO_4.2H_2O$; $CrPO_4.6H_2O$). The preferred peroxide promoter is trimethylolpropane trimethylacrylate which may be used alone or in combination with the other promoters.

In many instances the addition of a nucleating agent is also desired. It is preferred to use decabromodiphenyl ether, but also silicates, chalk, silica, and like compounds may be used.

It is important that the azodicarbonamide, the zinc compounds and the aromatic sulfinic acid (salt) be premixed before adding them to the foamable rubber or plastic. For convenience and improved effectiveness the peroxide promoters and nucleating agents may also be pre-blended with the above three ingredients. Curatives for rubber and plastics are well known in the art. Usually, rubbers are crosslinked by means of sulfur type curing systems including accelerators, retarders and the like. Peroxides are employed for the purpose of crosslinking rubbers and plastics. Care must be taken that the curative activation temperature falls within the decomposition temperature range of the blowing agent composition; preferably, the onset of curing should occur somewhat below such decomposition temperature.

The following examples, in which all parts and percentages are only weights unless otherwise noted, are given to illustrate the invention.

| Ingredients used: | |
|---|---|
| EPDM: | Ethylene (52%)-propylene (39%)-5-ethylidene-2-norbornene (9% by weight) terpolymer; ML-4 at 125° C.: 68. |
| SBR: | Blend of 80 parts SBR (5% styrene) and 20 parts SBR (85% styrene): ML-4 at 100° C.: 25. |
| ClBR: | Polychloroprene; ML-4 at 100° C.: 50. |
| Clay: | Specific gravity 2.6; particle size: ca. 95% less than 2 micron (SupreClay [trademark]). |
| Petrolatum: | Petroleum hydrocarbon. |
| Extender oil: | Naphthenic oil; SUS at 38° C. (Circosol [trademark] 4240). |
| Parraffin wax: | m.p. 60-65° C. (Sunproof [trademark] Improved Wax). |
| Antioxidant: | Reaction product of diphenylamine and secondary amine (Octamine [trademark]). |
| MBTS: | Mercaptobenzothiazole, curative. |
| DPG: | Diphenylquanidine. |
| PE: | Polyethylene; density 0.92 g/cm$^3$ |
| ADC-1: | Azodicarbonamide; av. particle size: 3 micron (average) (Celogen [trademark] AZ 130). |
| ADZ-2: | As above; particle size 9–12 micron. |
| ZnO: | Zinc oxide. |
| ZnAc: | Zinc diacetate. |
| ZnCO$_3$: | Zinc carbonate. |
| ZPTS: | Zinc di(p-toluenesulfinate). |
| PPR-1: | Peroxide promoter No. 1: trimethylolpropane trimethacrylate. |
| PPR-2: | Perioxide promoter No. 2: basic chromium sulfate. |
| PPR-3: | Sodium chromate. |
| PPR-4: | Chromium phosphate. |
| NA-1: | Nucleating agent No. 1: decarbromodiphenyl ether. |
| NA-2: | Nucleating agent No. 2: calcium silicate. |
| NA-3: | Nucleating agent No. 3: hydrous alumina silicate. |

EXAMPLE 1

Determination of Gas Evolution

Several blowing agent compositions were prepared by thoroughly mixing the various ingredients indicated in Table I in a Waring [trademark] blender. To ca. 1 g of composition, about 25 ml of dioctyl phthalate is added and the total mixture is mulled until a uniform mixture is obtained. A carefully weighed sample (ca. 5 g) is taken and placed in a gas evolution measuring device prepheated to a set temperature.

Gas evolutions are determined at various times thereafter as summarized in Table 1.

TABLE I

| Run No. | 1 | 2 | 3 | 4 | 5 | 6 | 7* | 8* |
|---|---|---|---|---|---|---|---|---|
| ADC, parts | 90 | 90 | 90 | 90 | 90 | 90 | 90 | 90 |
| ZnO, parts | 10 | 10 | 10 | 10 | 10 | 10 | 10 | — |
| ZPTS, parts | 1 | 2 | 3 | 4 | 5 | 10 | — | 10 |
| Gas evolution development at 135° C., cm$^3$/g of composition | | | | | | | | |
| Minutes | | | | | | | | |
| 1 | 4 | 6 | 5 | 4 | 7 | 4 | | 4 |
| 3 | 4 | 7 | 7 | 5 | 9 | 8 | | 6 |
| 5 | 5 | 9 | 9 | 8 | 12 | 17 | | 14 |
| 7.5 | 7 | 11 | 15 | 18 | 22 | 53 | | 22 |
| 10 | 12 | 22 | 33 | 47 | 50 | 93 | | 26 |
| 15 | 53 | 78 | 96 | 98 | 102 | 112 | | 31 |
| 20 | 89 | 102 | 115 | 111 | 116 | 121 | | 34 |
| 25 | 110 | 115 | 124 | 120 | 125 | 125 | | 38 |
| 30 | 127 | 122 | 132 | 127 | 130 | 128 | 0 | 40 |
| 30 Minutes Gas Evolution, adjusted to 1 g ADC | | | | | | | | |
| cm$^3$/g | 143 | 138 | 151 | 147 | 152 | 156 | 0 | 44 |

Remarks:
*Prior art compositions for comparison to the invention.

The data indicate not only that gas evolution in Runs No. 1–6 is unexpectedly remarkably increased over known compositions, Runs No. 7 and 8, but also that with increasing levels of ZPTS the rate of gas evolution is accelerated.

EXAMPLE 2

Using the procedure of Example 1, additional total gas evolutions at 135° C. were determined on compositions containing varying concentrations of zinc oxide and ZPTS. The results are indicated in Table II.

TABLE II

| Run No. | 9 | 10 | 11 | 12 |
|---|---|---|---|---|
| ADC, parts | 90 | 10 | 90 | 90 |
| ZnO, parts | 5 | 7 | 14 | 21 |
| ZPTS, parts | 5 | 3 | 6 | 7 |
| Results | | | | |
| cm$^3$/g, actual | 84 | 115 | 106 | 111 |
| cm$^3$/g, adjusted* | 93 | 128 | 129 | 136 |

*calculated to cm$^3$/one gram ADC
Remarks:
Increasing the concentration of ZnO leads to increasing amounts of adjusted gas evolved.

EXAMPLE 3

Further gas evolution measurements were undertaken to determine the effect of various lower levels of the aromatic sulfinic acid salt. The same procedure as in Example 1 was adopted. The various compositions and gas evolution developments at 135° C. and 149° C. are listed in Table III. Runs No. 21 and 22 are prior art compositions made for comparison to the invention.

TABLE III

| Run No. | 13 | 14 | 15 | 16 | 17 | 18 | 19 | 20 | 21 | 22 | 23 | 24 |
|---|---|---|---|---|---|---|---|---|---|---|---|---|
| ADC, parts | 90 | 90 | 90 | 90 | 90 | 90 | 90 | 90 | 90 | 90 | 90 | |
| ZnO, parts | 5 | 10 | 10 | 10 | 10 | 10 | 20 | 10 | 10 | — | — | — |
| ZnCO$_3$, parts | — | — | — | — | — | — | — | — | — | — | 10 | — |
| ZnAC, parts | — | — | — | — | — | — | — | — | — | — | — | 10 |
| APTS, parts | 0.5 | 0.1 | 0.25 | 0.5 | 0.75 | 1.0 | 0.5 | 10 | — | 10 | 1.0 | 1.0 |
| Gas evolution at 135° C., cm$^3$/g | | | | | | | | | | | | |

Time
(Minutes)

TABLE III-continued

| 1 | 5 | 5 | 4 | 5 | 6 | 5 | 4 | 4 | — | 4 | 9 | 7 |
|---|---|---|---|---|---|---|---|---|---|---|---|---|
| 3 | 5 | 6 | 5 | 6 | 7 | 7 | 4 | 8 | — | 6 | 9 | 14 |
| 5 | 5 | 6 | 5 | 6 | 7 | 7 | 5 | 17 | — | 14 | 11 | 25 |
| 7.5 | 6 | 6 | 5 | 6 | 7 | 7 | 6 | 53 | — | 22 | 14 | 39 |
| 10 | 7 | 6 | 5 | 7 | 10 | 9 | 6 | 93 | — | 26 | 24 | 47 |
| 15 | 8 | 6 | 5 | 10 | 21 | 20 | 13 | 112 | — | 31 | 72 | 59 |
| 20 | 15 | 6 | 5 | 21 | 50 | 59 | 54 | 121 | — | 34 | 117 | 70 |
| 25 | 31 | 7 | 8 | 58 | 80 | 86 | 142 | 125 | — | 38 | 140 | 76 |
| 30 | 49 | 9 | 15 | 108 | 103 | 106 | 147 | 128 | 0 | 40 | — | — |

30 Minute Gas Evolution at 135° C., adjusted to 1 g ADC

| $cm^3/g$ | 52 | 10 | 17 | 126 | 115 | 119 | 180 | 156 | 0 | 44 | 157 | 82 |

Gas evolution at 149° C., $cm^3/g$

| Time (minutes) | | | | | | | | | | | | |
|---|---|---|---|---|---|---|---|---|---|---|---|---|
| 1 | 4 | 5 | 4 | 4 | 6 | 4 | — | — | — | — | 7 | 9 |
| 3 | 5 | 6 | 5 | 6 | 9 | 5 | — | — | — | — | 11 | 21 |
| 5 | 9 | 7 | 6 | 9 | 11 | 10 | — | — | — | — | 35 | 46 |
| 7.5 | 28 | 13 | 16 | 64 | 125 | 126 | — | — | — | — | 172 | 105 |
| 10 | 73 | 110 | 161 | 163 | 165 | 162 | — | — | — | — | 175 | 149 |
| 15 | 156 | 168 | 164 | 167 | 165 | 164 | — | — | — | — | 178 | 166 |
| 20 | 172 | — | — | — | — | — | — | — | 0 | 112 | 178 | 180 |

Ultimate Gas evolution at 149° C., adjusted to 1 g ADC

| $cm^3/g$ | 183 | 187 | 183 | 186 | 185 | 184 | — | — | 0 | 124 | 200 | 202 |

The results indicate that even at low ZPTS concentrations, satisfactory gas evolutions can be achieved at 135° C., and even those compositions where the gas evolutions were less than desired at that temperature (No.'s 13, 14 and 15 ), their ability to provide controlled release of gas at copious amount is demonstrated by the 149° C. tests. Run No. 23 ($Na_2CO_3$) performed most satisfactorily and Run No. 24 (zinc diacetate) performed very well at 149° C.

The usefulness of the blowing agent compositions of this invention was investigated for the expansion of rubbers and plastics as follows:

EXAMPLE 4

Two rubber masterbatches were prepared using the following recipes:

| Masterbatch | parts by weight |
|---|---|
| EPDM | 30 |
| SBR | 75 |
| ClBR | 10 |
| Stearic acid | 4 |
| Clay | 100 |
| Silica filler | 50 |
| N550 FEF, Black | 10 |
| Petrolatum | 10 |
| Extender oil | 45 |
| Paraffin Wax | 5 |
| Antioxidant | 1 |
| Total | 340 |

On a Banbury [trademark] type B laboratory internal mixer all the ingredients were blended at a No. 2 speed while cooling. After 1.5 minutes, the ram was raised and scraped, and blending was continued for about another 3.5 minutes, then the batch was removed (batch temperature ca. 125° C.).

Two rubber stocks were then compounded on a two-roll mill using these ingredients

TABLE IV

| | (all in parts by weight) | |
|---|---|---|
| Run No. | 24 | 25[(1)] |
| Masterbatch | 340.0 | 340 |
| MBT | 0.75 | 0.75 |
| DPG | 0.45 | 0.45 |
| Sulfur | 2.75 | 2.75 |
| BAC[(2)] | 13.0 | — |
| ADC-1 | — | 11.58 |
| ZnO | — | 1.29 |
| ZPTS | — | 0.13 |
| Total parts | 356.95 | 356.95 |

Remarks:
[(1)]Prior Art, for comparison to invention.
[(2)]Preblend of ADC-1 (100 parts), ZnO (11 parts) and ZPTS (1.1 parts).

From each compounded stock blanks were formed (dimensions: 9.52×9.52×1.9 cm) weighing 300 g each by placing them in molds. The molds containing the slabs were placed in a press and were precured therein for 48 minutes at 143° C. Upon removing the precured slabs, they expanded rapidly to about 150% of their original size. Further expansion and cure was accomplished by keeping the two slabs in an oven for 1.5 hours at 154° C., after which time they were taken out of the oven and cooled.

Physical characteristics were determined the following day with these results:

| Run No. | 24' | 25' |
|---|---|---|
| Density | 0.17 | 0.22 |
| Surface | smooth | large blisters |
| Cell structure | fine | fine - very coarse |
| Cell uniformity | excellent | very bad |
| Compression set, % (ASTM D-1056) | 46 | 75 |

The expanded and cured slab of this invention (No. 24') excelled by its fine uniform cell structure and overall smooth appearance, whereas No. 25' contained large blisters on the surface and a most irregular core having large cavities. It is quite apparent that with regard to density and compression set, Run No. 24' is an unexpectedly superior product.

EXAMPLE 5

The blowing agent composition of this invention was evaluated for the expansion of polyethylene while simultaneously curing. A basic recipe was used througout (all in parts by weight), namely:

| | |
|---|---|
| Polyethylene | 84 |
| BAM* | 15 |
| Dicumylperoxide** | 1 |

*blowing agent composition or mixture
**Di Cup [trademark] R

The test samples were prepared in the following manner:

The polyethylene granules were placed on a two-roll mill heated to above their crystalline melting point and milled until the polymer melted or fluxed. Then, the BAM mixture (for details, see Tables V-VIII) was added as well as the peroxide and milling was continued for 5 minutes at that temperature. The compounded polyethylene was then sheeted off the mill and a circle (diameter: 12.7 cm) is cut from the center of the sheet. This circle is then placed in a press and heated at 121° C. for two minutes for shaping. From the center of this circle is cut a smaller circular piece having a 7.62 diameter. The latter is exposed to 204° C. temperature in an air circulating oven until optimum expansion is achieved.

In Tables V-VIII, only the ingredients comprising the blowing agent mixture are listed. Prior to the addition to the polyethylene, these ingredients are thoroughly mixed in a Waring [trademark] blender.

The cured and expanded polyethylene samples, after cooling, were cut to order to examine cell structure and cell uniformity. Density measurements were undertaken as well as the color of the samples was observed. The following ratings were aplied to the resultant samples (note the abbreviations used in the Tables):

| Criterion | Result | Rating |
|---|---|---|
| Density, cm³/g | greater than 0.07 | 0 |
| | 0.063–0.07 | 1 |
| | 0.056–0.062 | 2 |
| | 0.048–0.055 | 3 |
| | 0.04–0.047 | 4 |
| | less than 0.04 | 5 |
| Cell structure | vc (very coarse) | 1 |
| | c (coarse) | 2 |
| | m (medium) | 3 |
| | f (fine) | 4 |
| | vf (very fine) | 5 |
| Cell uniformity: | n-u (non-uniform) | 1 |
| | u (uniform) | 5 |
| Color: | vy (very yellow) | 1 |
| | y (yellow) | 2 |
| | ly (light yellow) | 3 |

Ratings of 9 and higher are desirable, prefeably 11 or higher and most preferably 13 or higher.

In Runs No. 26–31, the blowing agent composition was employed alone as well as with certain peroxide promoters and nucleating agents. Runs No. 32–36 are prior art made for the purposes of comparison. For details see Table V.

TABLE V

| | Run No. | | | | | |
|---|---|---|---|---|---|---|
| | 26 | 27 | 28 | 29 | 30 | 31 |
| ADC | 100 | 100 | 100 | 100 | 100 | 100 |
| ZnO | 4.8 | 9.6 | 5. | 11. | 0.4 | 0.4 |
| ZPTS | 0.5 | 1.0 | 0.5 | 1.1 | 2.7 | 2.7 |
| PPR-1 | — | — | 3.8 | 4.0 | 3.8 | 3.8 |
| PPR-2 | — | — | — | — | — | 0.5 |

TABLE V-continued

| | | | | | | |
|---|---|---|---|---|---|---|
| NA-1 | — | — | — | — | — | 0.3 |
| NA-2 | — | — | — | — | — | 1.1 |
| NA, total | — | — | — | — | — | 1.4 |
| Results | | | | | | |
| D, (g/cm³) | 0.05 | 0.04 | 0.034 | 0.027 | 0.042 | 0.037 |
| Cell structure | c | c | c | c | c | f |
| Color | ly | ly | ly | ly | ly | ly |
| Cell uniformity | u | u | u | u | u | u |
| Rating | 11 | 12 | 13 | 13 | 12 | 15 |

| | Run No. | | | | |
|---|---|---|---|---|---|
| | 32* | 33* | 34* | 35* | 36* |
| ADC | 100 | 100 | 100 | 100 | 100 |
| ZnO | 0.4 | — | 0.4 | 0.4 | 0.4 |
| ZPTS | — | 4.5 | — | — | — |
| PPR-1 | 3.8 | 3.8 | 3.8 | 3.8 | 3.8 |
| PPR-2 | — | — | 0.5 | — | — |
| NA-1 | — | — | — | 0.3 | — |
| NA-2 | — | — | — | — | 1.1 |
| NA, total | — | — | — | 0.3 | 1.1 |
| Results | | | | | |
| D, (g/cm³) | 0.094 | 0.045 | 0.074 | 0.072 | 0,11 |
| Cell structure | c | vc | c | m | c |
| Color | vy | y | y | y | vy |
| Cell uniformity | n-u | n-u | n-u | n-u | n-u |
| Rating | 4 | 8 | 5 | 6 | 4 |

*prior art, made for the purpose of comparison with the invention.

It is quite apparent from the results that the expanded polyethylene using the blowing agent composition of this invention consistently has specific and especially overall properties better than the experiments using known methods.

EXAMPLE 6

In order to determine the effect of nucleating agent when expanding polyethylene, additional experiments were conducted. The procedure of Example 5 was essentially employed. Table VI summarizes the results of Runs No. 37–41.

TABLE VI

| | Run No. | | | | |
|---|---|---|---|---|---|
| | 37 | 38 | 39 | 40 | 41 |
| ADC-2 | 100 | 100 | 100 | 100 | 100 |
| ZnO | 0.4 | 0.4 | 0.4 | 0.4 | 0.4 |
| ZPTS | 3.8 | 2.7 | 2.7 | 2.7 | 3.9 |
| PPR-1 | 3.8 | 3.8 | 3.8 | 3.8 | 3.9 |
| PPR-2 | 0.5 | 0.5 | 0.5 | 0.5 | 0.6 |
| NA-1 | — | — | 0.3 | 0.3 | 3.3 |
| NA-2 | — | 1.1 | — | 0.5 | 1.1 |
| NA-3 | — | — | 1.1 | — | — |
| NA, total | — | 1.1 | 1.1 | 0.8 | 4.4 |
| Results | | | | | |
| D, g/cm³ | 0.042 | 0.046 | 0.041 | 0.043 | 0.046 |
| Cell structure | m | f | c | f | m |
| Color | y | ly | ly | ly | ly |
| Cell uniformity | | Uniform throughout | | | |
| Rating | 12 | 14 | 12 | 14 | 13 |

The addition of a nucleating agent appears beneficial for reduction of color, but they are not essential for the preparation of a foam. Decabromodiphenyl ether and calcium silicate seem somewhat more effective then hydrous alumina silicate.

EXAMPLE 7

Various concentrations and ratios of ingredients, i.e., within the blowing agent composition per se, the peroxide promoters and nucleating agents were used in the preparation of expanded and cured polyethylene. The same procedure as in Example 5 was used; details and results are presented in Table VII.

TABLE VII

| | Run No. | | | | | | | |
|---|---|---|---|---|---|---|---|---|
| | 42 | 43 | 44 | 45 | 46 | 47 | 48 | 49 |
| ADC-2 | 100 | 100 | 100 | 100 | 100 | 100 | 100 | 100 |
| ZnO | 0.3 | 0.7 | 2.3 | 0.4 | 0.5 | 0.5 | 0.4 | 0.4 |
| ZPTS | 2.7 | 1.6 | 0.3 | 3.9 | 8.0 | 2.9 | 2.7 | 2.7 |
| PPR-1 | 3.8 | 3.8 | 3.8 | 1.7 | 4.0 | 11.7 | 3.8 | 3.8 |
| PPR-2 | 0.5 | 0.5 | 0.5 | 0.6 | 0.6 | 0.6 | 0.3 | 0.8 |
| NA-1 | 0.3 | 0.3 | 0.3 | 0.3 | 0.3 | 0.3 | 0.3 | 0.3 |
| NA-2 | 1.1 | 1.1 | 1.1 | 1.1 | 1.1 | 1.2 | 1.1 | 1.1 |
| NA: total | 1.4 | 1.4 | 1.4 | 1.4 | 1.4 | 1.5 | 1.4 | 1.4 |
| Results | | | | | | | | |
| D: (g/cm$^3$) | 0.05 | 0.056 | 0.035 | 0.07 | 0.04 | 0.046 | 0.04 | 0.035 |
| Cell structure | f | f | m | m | c | c | m | vf |
| Color | y | y | ly | y | y | vy | y | y |
| Rating | 12 | 11 | 14 | 9 | 11 | 10 | 11 | 13 |

(All samples exhibited uniform cell structure).

The blowing agent composition of this invention in combination with peroxide promoters provide a range of ingredient ratios for making cured and expanded plastics.

EXAMPLE 8

The effectiveness of certain chromium type peroxide promoters was investigated as well as the use of zinc carbonate as blowing agent enhancer for the purpose of expanding and crosslinking polyethylene. The method of Example 5 was substantially employed. Experimental details and results are disclosed in Table VIII.

TABLE VIII

| | Run No. | | | | | |
|---|---|---|---|---|---|---|
| | 50 | 51 | 52 | 53 | 54 | 55 |
| ADC-2 | 100 | 100 | 100 | 100 | 100 | 100 |
| ZnO | 0.4 | 0.4 | 0.4 | 2.5 | 2.5 | — |
| ZnCO$_3$ | — | — | — | — | — | 0.4 |
| ZPTS | 2.7 | 2.7 | 2.7 | 0.3 | 0.3 | 2.7 |
| PPR-1 | 3.8 | 3.8 | 3.8 | 3.8 | 3.8 | 3.8 |
| PPR-2 | — | — | — | — | — | 0.8 |
| PPR-3 | — | 0.4 | — | 0.4 | 0.8 | — |
| PPR-4 | — | — | 0.5 | — | — | — |
| NA-1 | 1.1 | 1.1 | 1.1 | 1.1 | 1.1 | 1.1 |
| Total NA | 1.4 | 1.4 | 1.4 | 1.4 | 1.4 | 1.4 |
| D, g/cm$^3$ | 0.046 | 0.04 | 0.09 | 0.035 | 0.035 | 0.05 |
| Cell structure | c | f | vf | f | f | c |
| Cell uniformity | u | u | u | u | n-u | u |
| color | ly | ly | ly | ly | ly | y |
| Rating | 12 | 14 | 11 | 15 | 13 | 10 |

From the results, it is apparent that certain chromium compounds may be used for improving all structure and uniformity with good to excellent overall ratings. The use of zinc carbonate instead of zinc oxide provided a satisfactory product.

EXAMPLE 9

The usefulness of this invention was further tested on a compounded rubber-plastic mixtures using the following recipes, all in parts by weight:

| | Run No. | |
|---|---|---|
| | 56 | 57* |
| EPM$^{(1)}$ | 30 | 30 |
| EVA$^{(2)}$ | 70 | 70 |
| Filler$^{(3)}$ | 30 | 30 |
| Zinc oxide | 2 | 2.5 |
| Zinc stearate | 2 | 2 |
| Peroxide$^{(2)}$ | 6 | 6 |

| | Run No. | |
|---|---|---|
| | 56 | 57* |
| Extender oil$^{(5)}$ | 15 | 15 |
| ADC-1 | — | 4.45 |
| ZPTS | — | 0.05 |
| BAC$^{(6)}$ | 5 | — |
| Stearic acid | 1 | 1 |
| Total Parts | 161 | 161 |

Remarks:
$^{(1)}$Ethylene (45%) propylene (55%) copolymer; ML-4 at 100° C.: 45
$^{(2)}$Ethylene (72%) - vinyl acetate (28%) copolymer; Melt Index: 6
$^{(3)}$Precipitated hydrated amorphous silica (Hi Sil [trademark] 233)
$^{(4)}$Bis(t-butylperoxy) diisopropylbenzene (40% onBurgees clay; Vulcup [trademark] 40KE)
$^{(5)}$Paraffinic oil (Sunpar [trademark] 2280)
$^{(6)}$(as in Example 4, Table IV)
*For the purpose of comparison with the invention.

The compounds were prepared as follows: EPM and EVA were mixed in a Banbury (type B) internal mixer for 2 minutes, then filler, zinc oxide, zinc stearate and extender oil were charged, the batch temperature being about 88° C. Blending was continued for about 4 minutes, and the respective remaining ingredients were added, and the batches were removed from the mixer after two more minutes of blending (temperature ca. 121° C.). The stocks were sheeted out on a two-roll mill (80°–90° C.) and (8.9×12.7 cm) pads were formed weighing about 170 g. These pads were placed in a (8.9×12.7×1 cm) mold and pressed at about 1500 psi (10.5 MPa) and cured under pressure for 38 minutes at 143° C.

When removing the pads, they expanded rapidly. Core samples were taken and the characteristics of the cooled (to room temperature) products determined.

| | Run No. | |
|---|---|---|
| | 56 | 57 |
| Density, g/cm$^3$ | 0.17 | 0.20 |
| Color | white | light yellow |
| Uniformity | uniform (minor irregularities) | nonuniform |
| Surface | smooth | blisters |
| Cell structure | fine-med. | fine-coarse |

It was difficult to remove sample 57' from the mold due to stickiness (no problems were encountered with sample 56'). Generally, the run prepared according to this invention, namely the addition of preblended blowing agent composition, exhibited density and cell characteristics unexpectedly superior to those of the comparison example.

We claim:

1. A masterbatched blowing agent composition for foaming a polymeric composition consisting essentially of:
   (a) azodicarbonamide;
   (b) zinc oxide, zinc carbonate or a zinc salt of $C_1$–$C_4$ organic acid; and
   (c) an aromatic sulfinic acid or a metal salt of an aromatic sulfinic acid,
wherein for each 100 parts by weight of (a), (b) is 0.25–25 parts by weight and (c) is from 1–2000 parts by weight per 100 parts of (b) and the total of (b)+(c) is from 2–25 parts by weight and substantially in the absence of the polymeric composition to be foamed.

2. A blowing agent composition according to claim 1 wherein (b) is from 5–25 parts by weight, and for each 100 parts of (b), (c) is from 1–100 parts by weight.

3. A blowing agent composition according to claim 1 wherein (b) is 0.25–10 parts by weight, and for each 100 parts of (b) (c) is from 10–160 parts by weight.

4. A blowing agent composition according to claim 2 wherein (b) is from 7–22 parts by weight and (c) is from 0.25–10 parts by weight for each 100 parts by weight of (b).

5. A blowing agent composition according to claim 2 wherein (b) is from 0.25–4 parts by weight and (c) is from 10–1000 parts by weight for each 100 parts of (b).

6. A blowing agent composition according to claim 3 further comprising a peroxide promoter.

7. A blowing agent composition according to claim 6 further comprising a chromium compound.

8. A blowing agent composition according to claim 7 wherein said chromium compound is from 0.1–1 parts by weight.

9. A composition according to claim 1 further comprising a nucleating agent of up to 5 parts per 100 parts azodicarbonamide.

* * * * *